(12) United States Patent
Palese

(10) Patent No.: US 12,164,146 B2
(45) Date of Patent: Dec. 10, 2024

(54) PHOTONIC INTEGRATED CIRCUIT-BASED TRANSMISSIVE/REFLECTIVE WAVEFRONT OPTICAL PHASE CONTROL

(71) Applicant: Raytheon Company, Waltham, MA (US)

(72) Inventor: Stephen P. Palese, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 331 days.

(21) Appl. No.: 17/662,797

(22) Filed: May 10, 2022

(65) Prior Publication Data

US 2023/0367063 A1 Nov. 16, 2023

(51) Int. Cl.
*G02B 6/12* (2006.01)
*H01Q 3/26* (2006.01)
*H04B 10/112* (2013.01)

(52) U.S. Cl.
CPC ......... *G02B 6/12004* (2013.01); *G02B 2006/12142* (2013.01); *H01Q 3/2676* (2013.01); *H04B 10/112* (2013.01)

(58) Field of Classification Search
CPC ...... G02B 6/12004; G02B 2006/12142; H04B 10/112
See application file for complete search history.

(56) References Cited

U.S. PATENT DOCUMENTS

| | | | |
|---|---|---|---|
| 4,798,437 A | 1/1989 | Rediker et al. | |
| 9,632,345 B2 | 4/2017 | Dorschner et al. | |
| 10,545,289 B1 | 1/2020 | Chriqui et al. | |
| 10,901,240 B2 | 1/2021 | Montoya et al. | |
| 2004/0125380 A1 | 7/2004 | Pepper | |
| 2011/0105019 A1* | 5/2011 | Tavassoli Hozouri | H01P 5/08 455/39 |
| 2017/0338874 A1* | 11/2017 | Pratt | H04B 7/0862 |
| 2022/0357429 A1* | 11/2022 | Seok | G01S 7/4818 |

OTHER PUBLICATIONS

Lau et al., Optical Phase Difference Measurement and Correction Using AlGaAs Integrated Guided-Wave Components, Oct. 1991, IEEE Photonics Technology Letters, vol. 3, No. 10, pp. 902-904.*

(Continued)

*Primary Examiner* — Ryan A Lepisto
*Assistant Examiner* — Erin D Chiem

(57) ABSTRACT

An apparatus includes a photonic integrated circuit having multiple cells. Each cell includes first and second antenna elements, where the first antenna element is configured to receive a portion of optical energy and the second antenna element is configured to transmit the portion of the optical energy. Each cell also includes a signal pathway configured to transport the portion of the optical energy between the first and second antenna elements. Each cell further includes a phase modulator configured to adjust a phase of the portion of the optical energy transported over the signal pathway. The apparatus also includes multiple wavefront sensors configured to measure wavefront errors in the portions of the optical energy. The apparatus further includes multiple phase controllers configured to adjust operation of the phase modulators in order to at least partially reduce the wavefront errors.

21 Claims, 7 Drawing Sheets

(56) References Cited

OTHER PUBLICATIONS

Yengst et al., "Digital Input Circuit Design for Photonic Integrated Circuit", U.S. Appl. No. 17/174,173, filed Feb. 11, 2021, 55 pages.

Palese et al., "Photonic Integrated Circuit-Based Communication Transmit/Receive System", U.S. Appl. No. 17/174,132, filed Feb. 11, 2021, 61 pages.

Palese et al., "Photonic Integrated Circuit-Based Coherently Phased Array Laser Transmitter", U.S. Appl. No. 17/162,860, filed Jan. 29, 2021, 35 pages.

Kendrick et al., "Photonic Integrated Circuit-Based Optical Phased Array Phasing Technique", U.S. Appl. No. 17/174,180, filed Feb. 11, 2021, 60 pages.

Inamdar et al., "Photonic Integrated Circuit-Based Optical Phased Array Calibration Technique", U.S. Appl. No. 17/174,197, filed Feb. 11, 2021, 61 pages.

Kendrick et al., "System and Method for Calibrating Pic-Based Optical Phased Array Transmitter and Receiver", U.S. Appl. No. 17/150,797, filed Jan. 15, 2021, 34 pages.

Shamee, "Photonic Integrated Circuit-Based Optical Phased Array Communication System", U.S. Appl. No. 17/643,114, filed Dec. 7, 2021, 28 pages.

Palese et al., "Photonic Integrated Circuit With Independent Unit Cells Having Multi-Polarization Sensitivity", U.S. Appl. No. 17/654,200, filed Mar. 9, 2022, 44 pages.

Palese et al., "Photonic Integrated Circuit-Based Polarization-Independent Optical Devices", U.S. Appl. No. 17/659,789, filed Apr. 19, 2022, 44 pages.

Kendrick et al., "Photonic Integrated Circuit-Based Imaging Systems", U.S. Appl. No. 17/654,204, filed Mar. 9, 2022, 35 pages.

International Search Report and Written Opinion of the International Searching Authority dated May 9, 2023 in connection with International Patent Application No. PCT/US2023/011258, 12 pages.

Rediker et al., "Optical Wavefront Measurement and/or Modification Using Integrated Optics," Journal of Lightwave Technology, vol. 6, No. 6, Jun. 1988, 17 pages.

Lau et al., "Optical Phase Difference Measurement and Correction using AlGaAs Integrated Guided-Wace Components," IEEE Photonics Technology Letters, vol. 3, No. 10, Oct. 1991, 3 pages.

\* cited by examiner

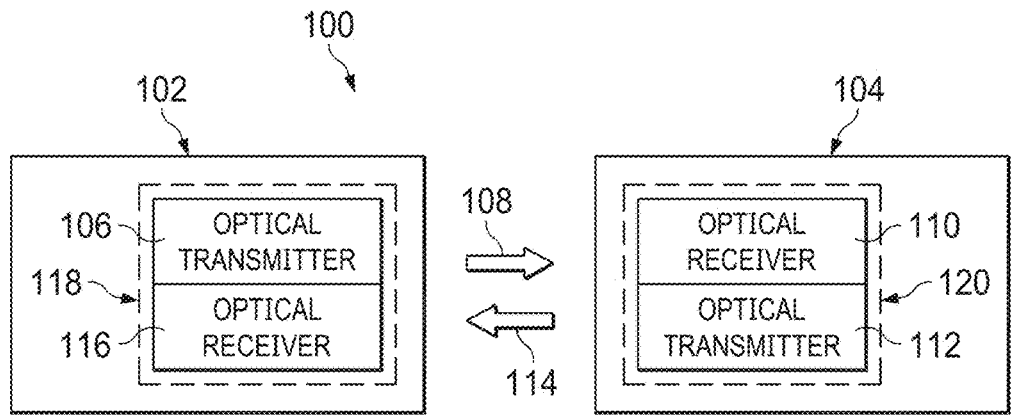
FIG. 1A
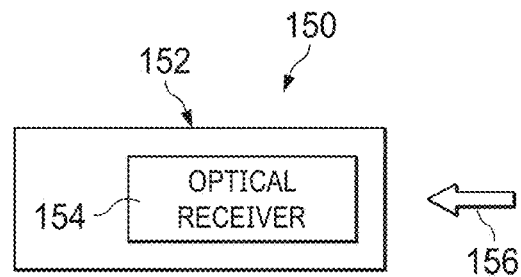
FIG. 1B
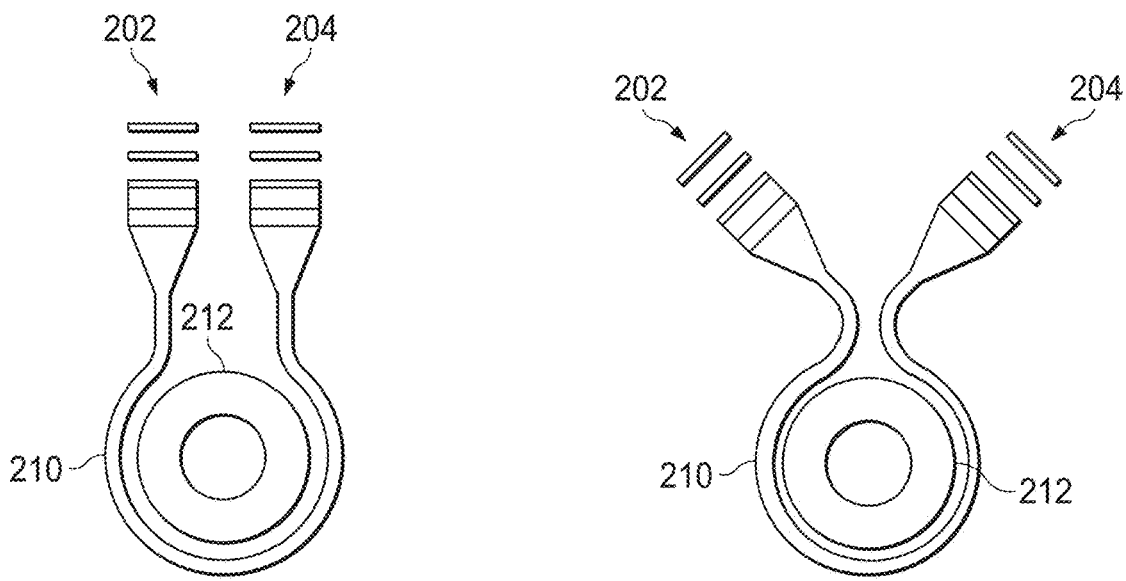
FIG. 3A                    FIG. 3B

PHOTONIC INTEGRATED CIRCUIT-BASED TRANSMISSIVE/REFLECTIVE WAVEFRONT OPTICAL PHASE CONTROL

TECHNICAL FIELD

This disclosure relates generally to optical systems. More specifically, this disclosure relates to photonic integrated circuit-based transmissive/reflective wavefront optical phase control.

BACKGROUND

Optical signals or other optical energy that propagates through the atmosphere or other turbulent or non-uniform transmission medium may accumulate wavefront errors. Wavefront errors can cause some portions of optical energy to arrive at a receiver at slightly different times than other portions of the optical energy. Wavefront errors are often caused by localized variations in the index of refraction of the atmosphere or other transmission medium through which optical energy is propagating. Wavefront errors can negatively impact imaging systems, communication systems, or other systems that receive and process optical energy, such as by reducing image resolution in imaging systems or by reducing effective signal powers in optical communication systems.

SUMMARY

This disclosure relates to photonic integrated circuit-based transmissive/reflective wavefront optical phase control.

In a first embodiment, an apparatus includes a photonic integrated circuit having multiple cells. Each cell includes first and second antenna elements, where the first antenna element is configured to receive a portion of optical energy and the second antenna element is configured to transmit the portion of the optical energy. Each cell also includes a signal pathway configured to transport the portion of the optical energy between the first and second antenna elements. Each cell further includes a phase modulator configured to adjust a phase of the portion of the optical energy transported over the signal pathway. The apparatus also includes multiple wavefront sensors configured to measure wavefront errors in the portions of the optical energy. The apparatus further includes multiple phase controllers configured to adjust operation of the phase modulators in order to at least partially reduce the wavefront errors.

In a second embodiment, a method includes receiving optical energy at a photonic integrated circuit and transmitting the optical energy from the photonic integrated circuit. The photonic integrated circuit includes multiple cells. Each cell includes first and second antenna elements, where the first antenna element receives a portion of the optical energy and the second antenna element transmits the portion of the optical energy. Each cell also includes a signal pathway that transports the portion of the optical energy between the first and second antenna elements. Each cell further includes a phase modulator that adjusts a phase of the portion of the optical energy transported over the signal pathway. The method also includes measuring wavefront errors in the portions of the optical energy using multiple wavefront sensors. The method further includes adjusting operation of the phase modulators using multiple phase controllers in order to at least partially reduce the wavefront errors.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 1A and 1B illustrate example systems supporting photonic integrated circuit-based transmissive/reflective wavefront optical phase control according to this disclosure;

FIGS. 3A and 3B illustrate example arrangements of transmitting and receiving antennas in the optical device of FIG. 2 according to this disclosure;

DETAILED DESCRIPTION

Figure 2:
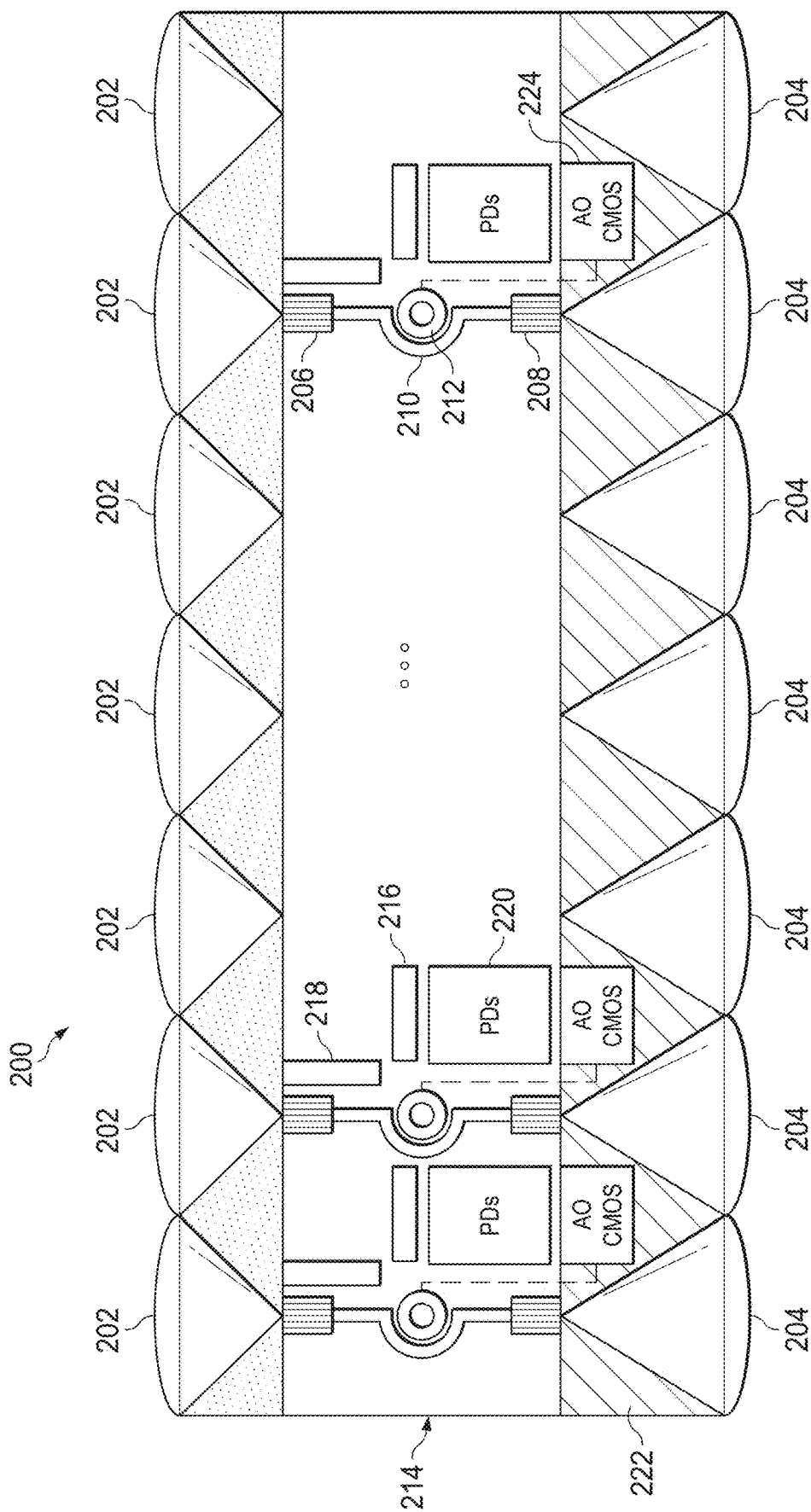
FIG. 2 illustrates an example optical device supporting photonic integrated circuit-based transmissive/reflective wavefront optical phase control according to this disclosure.

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, optical signals or other optical energy that propagates through the atmosphere or other turbulent or non-uniform transmission medium may accumulate wavefront errors. Wavefront errors can cause some portions of optical energy to arrive at a receiver at slightly different times than other portions of the optical energy. Wavefront errors are often caused by localized variations in the index of refraction of the atmosphere or other transmission medium through which optical energy is propagating. Wavefront errors can negatively impact imaging systems, communication systems, or other systems that receive and process optical energy, such as by reducing image resolution in imaging systems or by reducing effective signal powers in optical communication systems.

Various adaptive optic (AO) systems have been developed and used to reduce wavefront errors in various types of systems. Current adaptive optic systems often include a wavefront sensor for measuring wavefront errors in incoming optical energy and a wavefront control element (such as a deformable mirror, liquid crystal array, or micro-electro-mechanical system) to correct the measured wavefront errors. However, the wavefront sensor and the wavefront control element are physically separate components, which increases the size, weight, power, and cost (SWAP-C) of the overall system. Moreover, these approaches often require very high-precision alignments of the optical components, often on the order of one or several micro-radians, which can be difficult to achieve and maintain over time. In addition, current adaptive optic systems typically have low bandwidths (such as less than 300 Hz), which can limit their use to primarily atmospherically-stable locations (such as telescope sites).

This disclosure provides for photonic integrated circuit-based transmissive/reflective wavefront optical phase control. As described in more detail below, an optical device includes a photonic integrated circuit that implements an adaptive optic architecture having both (i) wavefront sensors for measuring wavefront errors and (ii) wavefront control elements for correcting the measured wavefront errors. In some embodiments, the wavefront control elements can be implemented using phase modulators within the photonic integrated circuit, and the phase modulators can be used to impart phase shifts to sub-apertures of incoming optical energy in order to correct the wavefront errors. Depending on the implementation, the photonic integrated circuit can provide transmissive wavefront optical phase control, reflective wavefront optical phase control, or both. When the photonic integrated circuit provides transmissive wavefront optical phase control, incoming optical energy is received along one surface of the photonic integrated circuit, and wavefront-corrected optical energy is transmitted along another surface of the photonic integrated circuit. When the photonic integrated circuit provides reflective wavefront optical phase control, incoming optical energy is received along one surface of the photonic integrated circuit, and wavefront-corrected optical energy is transmitted along the same surface of the photonic integrated circuit. A combination of approaches may also be supported by a photonic integrated circuit, such as when incoming optical energy is received along one surface of the photonic integrated circuit and wavefront-corrected optical energy is transmitted along the same surface of the photonic integrated circuit and along another surface of the photonic integrated circuit.

In this way, the photonic integrated circuits described in this disclosure can be used to correct wavefront errors in smaller packages, which can reduce the size, weight, power, and cost of an overall system. Also, because the various components of each photonic integrated circuit can be implemented in the same package, there may be little or no need to provide high-precision alignments of multiple optical components. Further, each of the photonic integrated circuits may operate at much higher bandwidths and may be able to compensate for very high levels of atmospheric turbulence or other disturbances. In addition, each of the photonic integrated circuits may be used to reduce wavefront errors in order to enable production of near diffraction-limited images, improve transmitter-receiver transmission link efficiencies, or achieve other desired results.

FIGS. 1A and 1B illustrate example systems 100 and 150 supporting photonic integrated circuit-based transmissive/reflective wavefront optical phase control according to this disclosure. As shown in FIG. 1A, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional 30 communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each of the optical transmitters 106 and 112, optical receivers 110 and 116, or optical transceivers 118 and 120 includes at least one photonic integrated circuit. In at least the optical receivers 110 and 116 or the optical transceivers 118 and 120, the photonic integrated circuit supports transmissive or reflective wavefront optical phase control. This allows the optical receivers 110 and 116 or the optical transceivers 118 and 120 to measure and correct wavefront errors contained in incoming optical signals 108 or 114, such as to correct wavefront errors caused by disturbances (like those caused by atmospheric propagation of the optical signals 108 or 114).

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays.

Note, however, that optical communication systems are one non-limiting example of the types of systems in which photonic integrated circuit-based transmissive/reflective wavefront optical phase control can be used. This type of functionality may be used in a number of other types of applications. For example, FIG. 1B illustrates an example system 150 containing an optical node 152 that includes an optical receiver 154. The optical node 152 represents a ground-, air-, or space-based system that can receive and process optical energy 156 using the optical receiver 154. The receipt and processing of the optical energy 156 may occur for any suitable purpose(s). For instance, the optical node 152 may represent a satellite or other device that captures images of the Earth's surface, other planetary bodies or other objects' surfaces, or celestial bodies. The optical node 152 may represent a medical device that performs optical medical imaging of patients' bodies or portions thereof. The optical node 152 may represent a consumer electronic device, such as a laptop, smartphone, tablet computer, or digital single-lens reflex (DSLR) camera or other camera, that captures images of scenes. As a particular example, the optical node 152 may use a photonic integrated circuit to provide fully-adjustable focus plane image processing that occurs after an image is captured. The optical node 152 may represent a component of a laser processing system, such as a system that uses one or more lasers to perform industrial or other functions. In general, this disclosure is not limited to any particular application of photonic integrated circuits providing transmissive or reflective wavefront optical phase control.

Although FIGS. 1A and 1B illustrate examples of systems 100 and 150 supporting photonic integrated circuit-based transmissive/reflective wavefront optical phase control, various changes may be made to FIG. 1. For example, while only two nodes 102 and 104 are shown in FIG. 1A and one node 152 is shown in FIG. 1B, each system 100, 150 may include any suitable number of nodes that engage in any suitable functions. Also, each node of the system 100, 150 may include any suitable number of optical transmitters, receivers, or transceivers. In addition, each of the systems 100, 150 is shown in simplified form here and may include any number of additional components in any suitable configuration as needed or desired.

FIG. 2 illustrates an example optical device 200 supporting photonic integrated circuit-based transmissive/reflective wavefront optical phase control according to this disclosure. For ease of explanation, the optical device 200 may be described as being used to at least partially implement each of the optical transmitters 106, 112, optical receivers 110, 116, 154, or optical transceivers 118, 120 in FIGS. 1A and 1B. However, each of the optical transmitters, optical receivers, or optical transceivers may be implemented in any other suitable manner. Also, the optical device 200 may be used in any other suitable device and in any other suitable system, including devices and systems that are used for functions other than or in addition to optical communications (such as optical imaging).

As shown in FIG. 2, the optical device 200 is formed using a photonic integrated circuit. Various components of the photonic integrated circuit may be formed from any suitable material(s), such as silicon, germanium, silicon oxide, indium phosphide, gallium nitride, silicon nitride, or gallium arsenide, and in any suitable manner. In this example, the photonic integrated circuit includes multiple cells, where each cell includes a first lenslet 202 and a second lenslet 204. Each lenslet 202 represents a very small lens, such as a microlens or nanolens, that can focus incoming light. Each lenslet 204 represents a very small lens, such as a microlens or nanolens, that can expand or otherwise modify outgoing light. The collection of lenslets 202 forms a first lenslet array in the optical device 200, and the collection of lenslets 204 forms a second lenslet array in the optical device 200. Each lenslet 202, 204 may be formed from any suitable material(s) and in any suitable manner. Each lenslet 202, 204 may also have any suitable size, shape, and dimensions. In some embodiments, for instance, each lenslet 202, 204 may represent a convex lens.

Each cell in the photonic integrated circuit of the optical device 200 also includes an antenna element 206 and an antenna element 208. Each antenna element 206 represents a nanophotonic antenna or other antenna element that receives at least one optical signal or other optical energy. Each antenna element 208 represents a nanophotonic antenna or other antenna element that transmits at least one optical signal or other optical energy. The collection of antenna elements 206 forms a first antenna array in the optical device 200, and the collection of antenna elements 208 forms a second antenna array in the optical device 200. Each antenna element 206, 208 may be formed from any suitable material(s) and in any suitable manner. Each antenna element 206, 208 may also have any suitable size, shape, and dimensions.

In this example, incoming optical energy can be received at the lenslets 202 and focused into the corresponding antenna elements 206. Also, outgoing optical energy can be transmitted from the antenna elements 208 and modified by the corresponding lenslets 204. In each cell of the photonic integrated circuit of the optical device 200, the antenna element 206 is optically coupled to the corresponding antenna element 208 by a signal pathway 210. Each signal pathway 210 transports the optical energy received by the associated antenna element 206 to the associated antenna element 208. As a result, the antenna elements 208 can be used to re-transmit the optical signals or other optical energy received by the antenna elements 206. Each signal pathway 210 includes any suitable structure configured to transport optical energy, such as an optical waveguide. Note that the specific signal pathways 210 shown here are for illustration only and can vary based on how the associated antenna elements 206 and 208 are positioned relative to one another.

Each cell of the photonic integrated circuit of the optical device 200 further includes a phase modulator 212 that is used to adjust the phase of optical energy passing through the signal pathway 210 optically coupling the pair of antenna elements 206, 208 in that cell. For example, the phase modulators 212 can be individually controlled or groups of the phase modulators 212 can be collectively controlled in order to adjust the phases of the optical energy passing through the signal pathways 210 in the cells of the photonic integrated circuit. Ideally, the phase modulators 212 can be controlled so that any wavefront errors present in the incoming optical energy is substantially corrected and so that the re-transmitted optical energy contains little if any wavefront errors. Here, this is accomplished by using the phase modulators 212 to impart phase shifts to sub-apertures of the incoming optical energy, which means that the phase modulators 212 can modify phases of portions of the incoming optical energy that are much smaller than the aperture through which the entire incoming optical energy is received. Each phase modulator 212 includes any suitable structure configured to modulate the phase of an optical signal, such as a resonant micro-ring modulator or a PN junction micro-ring modulator. In some cases, each phase modulator 212 may be a resonant micro-ring modulator that is about 5.5 µm to about 6 µm in diameter, although modulators of other sizes may be used here.

In the example shown in FIG. 2, the antenna elements 206-208, signal pathways 210, and phase modulators 212 are shown as residing within a common layer 214. In FIG. 2, the layer 214 is illustrated as a relatively thick layer in which the antenna elements 206-208 are positioned along opposite edges of the layer 214 and are optically coupled vertically by the signal pathways 210. However, this is for ease of illustration and explanation only. In many implementations, the layer 214 would be a much thinner layer, and the signal pathways 210 would predominantly travel horizontally to route optical energy between antenna elements 206-208 that are positioned more laterally with respect to one another. The vertical arrangement of the layer 214 shown in FIG. 2 is used merely to illustrate the components of the layer 214. Also, in this example, the antenna elements 206-208 of each pair of antenna elements 206-208 are shown as being positioned on opposite sides of the associated phase modulator 212. This is for illustration only, and other arrangements of the antenna elements 206-208 (including two examples discussed below) may be used.

Individual cells or groups of cells in the photonic integrated circuit of the optical device 200 further include various sensing and control components that are used to measure wavefront errors in incoming optical energy and to control the phase modulators 212 in order to reduce or eliminate the measured wavefront errors. In this example embodiment, these components include wavefront sensors, each of which may be formed using a set of antennas 216 and 218 and a set of optical detectors 220. The antennas 216 and 218 and the optical detectors 220 are used to detect or measure one or more characteristics associated with a wavefront of incoming optical energy received at various cells of the photonic integrated circuit.

In this example, each antenna 216 and 218 represents a rectilinear antenna or other "high aspect ratio" antenna, meaning the length of the antenna 216 or 218 is significantly larger than the width of the antenna 216 or 218. In other cases, each antenna 216 and 218 may be formed using an elongated array of sensors. In still other cases, each antenna 216 and 218 may have another suitable form factor or design. Each set of antennas 216 and 218 in the photonic integrated circuit of the optical device 200 can be used to capture incoming optical energy along different wavefront axes. In some embodiments, the antennas 216 and 218 in each set can be arranged orthogonally to one another in order to provide measurements associated with orthogonal wavefront axes. In other embodiments, the antennas 216 and 218 in each set can have another suitable arrangement.

The optical detectors 220 measure the optical energy captured by their associated antennas 216 and 218 in order to generate wavefront measurements along the different wavefront axes. For example, different optical detectors 220 may measure the optical energy captured by different antennas 216 and 218 in each set of antennas. By using elongated antennas 216 and 218 or other suitable elongated sensing arrangements, larger wavefront sensor signals may be generated along the appropriate wavefront axes and used, for instance, to identify the average wavefront slope along the wavefront axes. Since separate optical detectors 220 can be used with separate antennas 216 and 218 here, the optical detectors 220 can be used to generate independent wavefront measurements along the wavefront axes. Each optical detector 220 includes any suitable structure configured to measure wavefront errors in incoming optical energy, such as one or more photodetectors. The wavefront measurements here can be associated with any suitable wavefront axes defining a coordinate system, such as x-y or r-θ coordinates. As described below, it is also possible to identify wavefront slopes associated with incoming optical energy, such as by heterodyning wavefront measurements across multiple adjacent cells in the photonic integrated circuit.

Measurements of the wavefront errors (possibly along with other information) can be used by components of a control layer 222 to control the operations of the phase modulators 212 or other components of the optical device 200. For example, the control layer 222 may include adaptive optic (AO) phase controllers 224, which can be used to adjust or control the operations of the phase modulators 212. As a particular example, the phase controllers 224 can adjust or control the operations of the phase modulators 212 based on the measured wavefront errors. Ideally, the phase controllers 224 can cause the phase modulators 212 to adjust the phases of portions of incoming optical energy so that the outgoing optical energy has little or no wavefront errors. Each phase controller 224 includes any suitable structure configured to control the operation of a phase modulator 212, such as a complementary metal oxide semiconductor (CMOS) phase controller.

Again, in the example shown in FIG. 2, the layer 222 is illustrated as a relatively thick layer in which the phase controllers 224 are positioned. However, this is for ease of illustration and explanation only. In many implementations, the layer 222 would be a much thinner layer, and the phase controllers 224 and other components would be positioned more laterally with respect to one another. The vertical arrangement of the layer 222 shown in FIG. 2 is used merely to illustrate the components of the layer 222. Also, in this example, the layer 222 may include openings or otherwise be designed to allow optical energy to pass through the layer 222 between the antenna elements 208 and the lenslets 204.

Note that the control layer 222 may support any function or functions in addition to providing phase modulation control. For example, the control layer 222 may include components that can collect phase and amplitude information associated with incoming optical signals, and this information may be used in any suitable manner and for any suitable purpose(s). As a particular example, phase and amplitude information may be used to computationally reconstruct images at a number of possible image planes. Also note that any number of additional components may be included in or used with the photonic integrated circuit in the optical device 200. For instance, an external laser source or an external receiver may be used with the photonic integrated circuit, or a laser source or receiver may be incorporated into the photonic integrated circuit or into a package that includes the photonic integrated circuit.

In addition, note that while each cell of the optical device 200 includes antennas 216 and 218 and optical detectors 220 in this example, it is possible for a common arrangement of antennas 216 and 218 and optical detectors 220 to be used with multiple cells of the optical device 200. One example of this is described below, where antennas 216 and 218 and optical detectors 220 are used to identify wavefront information associated with four cells of the optical device 200. As another example, it is possible to capture wavefront measurements for some cells of the optical device 200 and interpolate wavefront measurements for other cells of the optical device 200. In general, this disclosure is not limited to any particular association of wavefront sensors to cells (antenna elements 206-208/signal pathways 210/phase modulators 212).

Overall, the optical device 200 functions as a photonic integrated circuit-based adaptive optic system, which includes wavefront sensors for measuring wavefront errors and phase modulators for making wavefront adjustments. These components can be integrated into the same package, along with control electronics for the photonic integrated circuit. This can help to provide a compact package that enables effective wavefront corrections and reduce optical alignment issues. Also, the optical device 200 can be configured in different ways to support signal transmission, signal reflection, or both. That is, in the arrangement shown in FIG. 2, optical signals are transmitted through the optical device 200, so the optical device 200 supports transmissive operation. If the lenslets 202 and 204 are positioned along the same side of the optical device 200, the optical device 200 can support reflective operation. If lenslets 204 are positioned both (i) along the illustrated surface opposite the lenslets 202 and (ii) along the same surface as the lenslets 204, the optical device 200 can support both transmissive and reflective operation.

Although FIG. 2 illustrates one example of an optical device 200 supporting photonic integrated circuit-based transmissive/reflective wavefront optical phase control, various changes may be made to FIG. 2. For example, components can be added, omitted, combined, further subdivided, replicated, or placed in any other suitable configuration in the optical device 200 according to particular needs. Also, the sizes, shapes, and dimensions of the optical device 200 and its individual components can vary as needed or desired. Further, the layout and arrangement of the components in the optical device 200 can vary as needed or desired, and some components may be shared among multiple cells of the photonic integrated circuit of the optical device 200. In addition, while the optical device 200 has been described as receiving optical signals using the lenslets 202 and antenna elements 206 and transmitting optical signals using the lenslets 204 and antenna elements 208, optical signals may also or alternatively flow in the opposite direction through the optical device 200.

FIGS. 3A and 3B illustrate example arrangements of transmitting and receiving antennas in the optical device 200 of FIG. 2 according to this disclosure. More specifically, FIGS. 3A and 3B illustrate other example arrangements of the antenna elements 206, 208 in the cells of the photonic integrated circuit of the optical device 200. As shown in FIG. 3A, the antenna elements 206, 208 in each of at least some of the cells of the photonic integrated circuit may be positioned next to one another. Also, the antenna elements 206, 208 may have substantially the same orientation as one another as is shown in FIG. 3A. In this case, the optical signals received and transmitted by the optical device 200 may have substantially the same polarization. As shown in FIG. 3B, the antenna elements 206, 208 in each of at least some of the cells of the photonic integrated circuit again may be positioned next to one another. Also, the antenna elements 206, 208 may have substantially orthogonal orientations to one another as is shown in FIG. 3B. In that case, the optical signals received and transmitted by the optical device 200 may have substantially opposite polarizations (such as S and P polarizations).

Because of this flexibility, it is possible to design the optical device 200 to perform various functions related to the polarizations of incoming and outgoing optical signals (in addition to performing functions related to wavefront corrections). For example, depending on the design of the optical device 200, the optical device 200 may be used to provide polarization corrections in addition to wavefront phase control. As another example, the optical device 200 may be designed to perform polarization multiplexing of its incoming and outgoing optical signals.

Although FIGS. 3A and 3B illustrate examples of arrangements of transmitting and receiving antennas in the optical device 200 of FIG. 2, various changes may be made to FIGS. 3A and 3B. For example, the antenna elements 206, 208 in each cell of the photonic integrated circuit of the optical device 200 may have any other suitable configuration depending on the design and function of the optical device 200.

Figure 4:
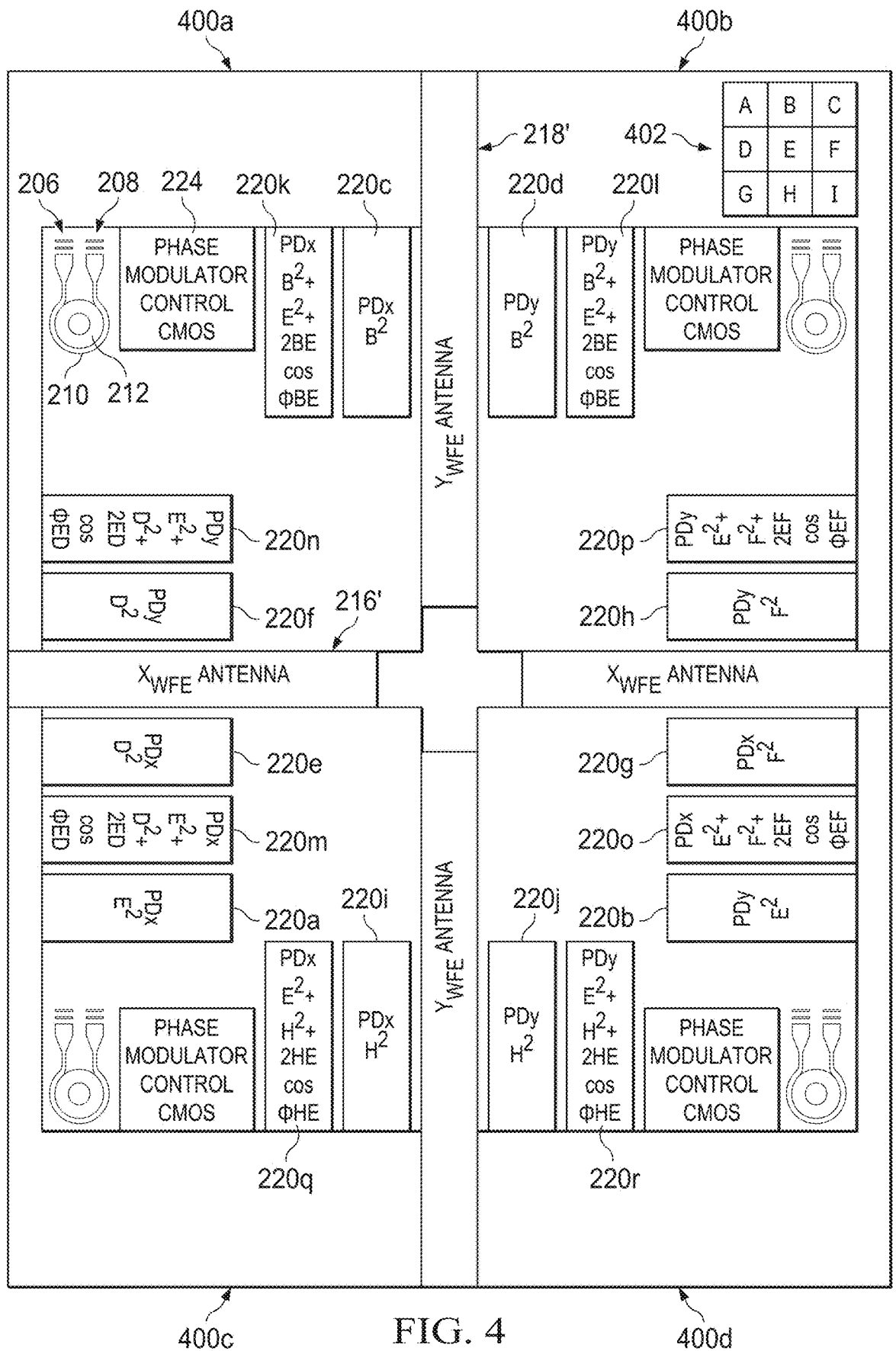
FIGS. 4 and 5 illustrate example cells in a photonic integrated circuit supporting transmissive/reflective wavefront optical phase control according to this disclosure.
Figure 5:
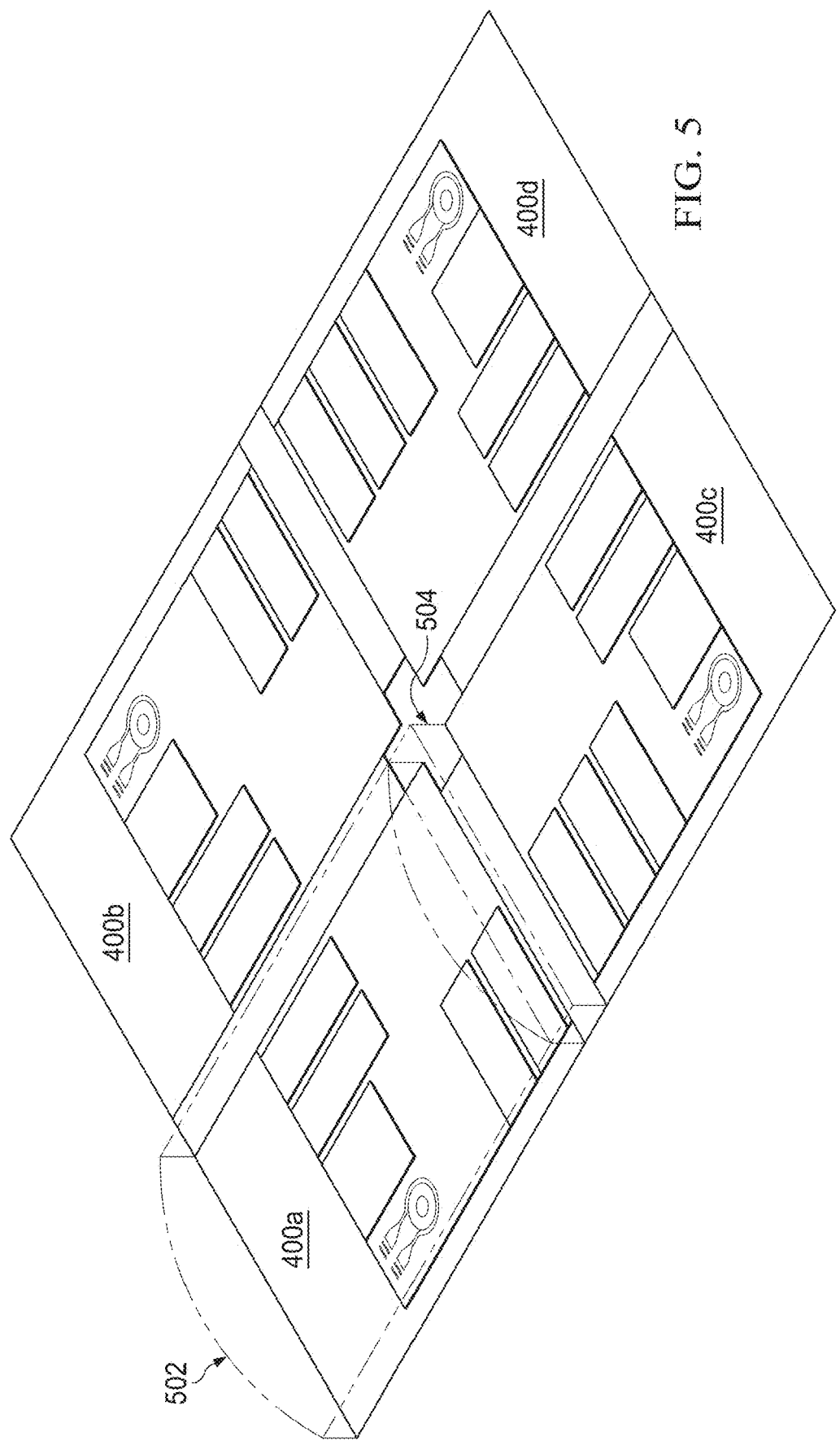

FIGS. 4 and 5 illustrate example cells 400a-400d in a photonic integrated circuit supporting transmissive/reflective wavefront optical phase control according to this disclosure. More specifically, FIG. 4 illustrates one example of a collection of cells 400a-400d in the photonic integrated circuit of the optical device 200, and FIG. 5 illustrates one example of a lenslet arrangement that may be used with each cell 400a-400d in the photonic integrated circuit of the optical device 200.

As shown in FIG. 4, each cell 400a-400d of the photonic integrated circuit includes two antenna elements 206, 208 that are optically coupled by a signal pathway 210 and associated with a phase modulator 212. While the antenna elements 206, 208, signal pathway 210, and phase modulator 212 in each cell 400a-400d are shown here as having the form from FIG. 3A, these components may be arranged in any other suitable manner (including the arrangement shown in FIG. 2 or FIG. 3B). Each cell 400a-400d also includes an associated phase controller 224, which can be used to control the phase modulator 212 of that cell.

A wavefront sensor is used here in conjunction with the four cells 400a-400d. In this example embodiment, the wavefront sensor includes two antennas 216' and two antennas 218' that are used to capture incoming optical energy in order to generate wavefront measurements associated with two wavefront axes (which are orthogonal in this example). Here, each antenna 216' represents a horizontal rectilinear antenna or other elongated antenna positioned between two cells arranged vertically with respect to one another, and each antenna 218' represents a vertical rectilinear antenna or other elongated antenna positioned between two cells arranged horizontally with respect to one another. Note that the terms horizontal and vertical are used here with reference to FIG. 4 only and do not impart any limitation on the orientation of the optical device 200 during fabrication or use.

In this particular example, a layout 402 defines how multiple instances of the cells 400a-400d and the wavefront sensor may be positioned. The specific cells 400a-400d and the wavefront sensor shown in FIG. 4 represent components in unit "E" of the layout 402. As noted above, the optical device 200 may be configured to identify wavefront slopes associated with incoming optical energy, such as by heterodyning wavefront measurements across multiple adjacent cells in the photonic integrated circuit. Here, this is accomplished using a set of optical detectors 220a-220r, which are configured to generate both (i) homodyne wavefront measurements associated with the specific cells 400a-400d in unit "E" and (ii) heterodyne wavefront measurements associated with cells in adjacent units. In some embodiments, each unit "A" through "I" of the photonic integrated circuit may generate wavefront measurements based on optical energy received at the cells 400a-400d in that unit and based on optical energy received at cells 400a-400d in any orthogonally-arranged adjacent units. For example, the optical detectors 220a-220r in unit "E" can be used to generate wavefront measurements based on optical energy received by the cells 400a-400d in unit "E" and by identical or similar cells in units "B", "D", "F", and "H" (since those units are orthogonal to unit "E"). Similar arrangements of optical detectors may be used in other units of the photonic integrated circuit. However, it should be noted that edge and corner units of the photonic integrated circuit may lack certain optical detectors since those units lack orthogonal neighbors in one or more directions (such as when the top corner unit of the photonic integrated circuit lacks orthogonal neighboring units above and to the left).

In this example, an optical detector 220a is coupled to at least one of the antennas 216', and an optical detector 220b is coupled to at least one of the antennas 218'. These optical detectors 220a-220b are used to generate wavefront measurements associated with the cells 400a-400d in that unit of the photonic integrated circuit (unit "E" in this example). For example, the optical detector 220a can generate wavefront measurements associated with the horizontal wavefront axis in unit "E" of the photonic integrated circuit, and the optical detector 220b can generate wavefront measurements associated with the vertical wavefront axis in unit "E" of the photonic integrated circuit.

An optical detector 220c is coupled to at least one antenna 216' in an upper neighboring unit of the photonic integrated circuit (unit "B" in this example), and an optical detector 220d is coupled to at least one antenna 218' in the upper neighboring unit of the photonic integrated circuit. These optical detectors 220c-220d are used to generate wavefront measurements associated with the cells 400a-400d in the upper neighboring unit of the photonic integrated circuit. For example, the optical detector 220c can generate wavefront measurements associated with the horizontal wavefront axis in unit "B" of the photonic integrated circuit, and the optical detector 220d can generate wavefront measurements associated with the vertical wavefront axis in unit "B" of the photonic integrated circuit.

An optical detector 220e is coupled to at least one antenna 216' in a left neighboring unit of the photonic integrated circuit (unit "D" in this example), and an optical detector 220f is coupled to at least one antenna 218' in the left neighboring unit of the photonic integrated circuit. These optical detectors 220e-220f are used to generate wavefront measurements associated with the cells 400a-400d in the left neighboring unit of the photonic integrated circuit. For example, the optical detector 220e can generate wavefront measurements associated with the horizontal wavefront axis in unit "D" of the photonic integrated circuit, and the optical detector 220f can generate wavefront measurements associated with the vertical wavefront axis in unit "D" of the photonic integrated circuit.

An optical detector 220g is coupled to at least one antenna 216' in a right neighboring unit of the photonic integrated circuit (unit "F" in this example), and an optical detector 220h is coupled to at least one antenna 218' in the right neighboring unit of the photonic integrated circuit. These optical detectors 220g-220h are used to generate wavefront measurements associated with the cells 400a-400d in the right neighboring unit of the photonic integrated circuit. For example, the optical detector 220g can generate wavefront measurements associated with the horizontal wavefront axis in unit "F" of the photonic integrated circuit, and the optical detector 220h can generate wavefront measurements associated with the vertical wavefront axis in unit "F" of the photonic integrated circuit.

An optical detector 220i is coupled to at least one antenna 216' in a lower neighboring unit of the photonic integrated circuit (unit "H" in this example), and an optical detector 220j is coupled to at least one antenna 218' in the lower neighboring unit of the photonic integrated circuit. These optical detectors 220i-220j are used to generate wavefront measurements associated with the cells 400a-400d in the lower neighboring unit of the photonic integrated circuit. For example, the optical detector 220i can generate wavefront measurements associated with the horizontal wavefront axis in unit "H" of the photonic integrated circuit, and the optical detector 220j can generate wavefront measurements associated with the vertical wavefront axis in unit "H" of the photonic integrated circuit.

The wavefront measurements generated by the optical detectors 200a-200j represent homodyne wavefront measurements because they represent wavefront measurements associated with individual units of the photonic integrated circuit. The optical detectors 200a-200b generate wavefront measurements associated with unit "E", the optical detectors 200c-200d generate wavefront measurements associated with unit "B", the optical detectors 200e-200f generate wavefront measurements associated with unit "D", the optical detectors 200g-200h generate wavefront measurements associated with unit "F", and the optical detectors 200i-200j generate wavefront measurements associated with unit "H". Heterodyne wavefront measurements represent wavefront measurements associated with multiple units of the photonic integrated circuit, and heterodyne wavefront measurements in FIG. 4 are generated using optical detectors 220k-220r. Each of these optical detectors 220k-220r is coupled to multiple antennas 216' or 218', namely at least one antenna 216' or 218' in its associated unit (unit "E" in this example) and at least one antenna 216' or 218' in a neighboring unit of the photonic integrated circuit.

The optical detector 220k is coupled to at least one antenna 216' in the unit "E" and to at least one antenna 216' in the upper neighboring unit (unit "B" in this example), and the optical detector 220k can generate heterodyne wavefront measurements associated with the horizontal wavefront axis for these two units. Similarly, the optical detector 220l is coupled to at least one antenna 218' in the unit "E" and to at least one antenna 218' in the upper neighboring unit, and the optical detector 220l can generate heterodyne wavefront measurements associated with the vertical wavefront axis for these two units.

The optical detector 220m is coupled to at least one antenna 216' in the unit "E" and to at least one antenna 216' in the left neighboring unit (unit "D" in this example), and the optical detector 220m can generate heterodyne wavefront measurements associated with the horizontal wavefront axis for these two units. Similarly, the optical detector 220n is coupled to at least one antenna 218' in the unit "E" and to at least one antenna 218' in the left neighboring unit, and the optical detector 220n can generate heterodyne wavefront measurements associated with the vertical wavefront axis for these two units.

The optical detector 220o is coupled to at least one antenna 216' in the unit "E" and to at least one antenna 216' in the right neighboring unit (unit "F" in this example), and the optical detector 220o can generate heterodyne wavefront measurements associated with the horizontal wavefront axis for these two units. Similarly, the optical detector 220p is coupled to at least one antenna 218' in the unit "E" and to at least one antenna 218' in the right neighboring unit, and the optical detector 220p can generate heterodyne wavefront measurements associated with the vertical wavefront axis for these two units.

The optical detector 220q is coupled to at least one antenna 216' in the unit "E" and to at least one antenna 216' in the lower neighboring unit (unit "H" in this example), and the optical detector 220q can generate heterodyne wavefront measurements associated with the horizontal wavefront axis for these two units. Similarly, the optical detector 220r is coupled to at least one antenna 218' in the unit "E" and to at least one antenna 218' in the lower neighboring unit, and the optical detector 220r can generate heterodyne wavefront measurements associated with the vertical wavefront axis for these two units.

In this example, the operation of each of the optical detectors 220a-220j is expressed as being associated with a particular direction (PDx for horizontal and PDy for vertical) and with a particular unit (E, B, D, F, and H). The notations for the particular units are shown as using a squared notation ($E^2$, $B^2$, $D^2$, $F^2$, and $H^2$) since wavefront errors are often expressed as a root mean square wavefront error, which is calculated as the square root of the difference between the average squared wavefront deviations minus the squared average wavefront deviation. Also, in this example, the operation of each of the optical detectors 220k-220r is expressed as being associated with a particular direction (PDx for horizontal and PDy for vertical) and with two particular units (E and B, E and D, E and F, and E and H). The notations for the particular units are shown as using a squared notation ($E^2$, $B^2$, $D^2$, $F^2$, and $H^2$) plus "2XY cos $\phi_{XY}$" (where X and Y each represents E, B, D, F, or H). This notation represents the fact that the wavefront errors can span multiple units of the photonic integrated circuit and can vary based on the angle of rotation of the optical device 200 relative to another optical device.

In order to support the use of optical energy captured by an antenna 216', 218' by the optical detectors 220a-220r of the unit in which the antenna 216', 218' is located and possibly by optical detectors in one or more adjacent units, the antenna 216', 218' can be coupled to an optical splitter. Each optical splitter can divide the optical energy captured by an antenna 216', 218' and provide portions of the captured optical energy to different optical detectors. Each of the optical splitters may be implemented in any suitable manner, such as by using an optical waveguide. These optical splitters are omitted from FIG. 4 for clarity, since showing an optical splitter for each antenna 216', 218' would complicate the illustration.

As shown in FIG. 5, each cell 400a-400d of the photonic integrated circuit includes or is associated with at least one lenslet 502 and a lenslet 504. The lenslet 502 may represent one or both of a lenslet 202 and a lenslet 204, meaning the lenslet 502 can be used to focus incoming optical energy onto an antenna element 206 or modify outgoing optical energy provided from an antenna element 208 in the associated cell. The lenslet 502 can have any suitable size and shape, such as an aspheric design as shown in FIG. 5. The lenslet 504 represents a flat lens that is positioned over one of the antennas 216', 218'. In some cases, the lenslet 504 can allow optical energy to pass through the lenslet 504 substantially unmodified. The lenslet 504 allows the associated antenna 216', 218' to capture optical energy along a specified wavefront axis. By using four instances of the lenslets 502-504, the cells 400a-400d and their associated antennas 216', 218' can be substantially or completely covered by the lenslets 502-504.

In the illustrated embodiment of FIGS. 4 and 5, each of the phase controllers 224 can process information from some or all of the optical detectors 220a-220r in order to identify wavefront errors within the associated unit and across different units of the photonic integrated circuit. One or more of the phase controllers 224 can then adjust operation of one or more of the phase modulators 212 in order to significantly reduce or eliminate the identified wavefront errors. For example, one or multiple ones of the phase controllers 224 may increase or decrease the amount(s) of phase adjustment(s) provided by one or multiple ones of the phase modulators 212 so that the resulting optical energy transmitted from the optical device 200 has little if any wavefront errors.

Although FIGS. 4 and 5 illustrate examples of cells in a photonic integrated circuit supporting transmissive/reflective wavefront optical phase control, various changes may be made to FIGS. 4 and 5. For example, while four cells 400a-400d are shown as being associated with a wavefront sensor here, the wavefront sensor may be associated with different numbers of cells. Also, while the layout 402 represents a three-by-three arrangement of units, a photonic integrated circuit may include any other suitable arrangement of units. In addition, this particular example of the cells shows various optical detectors 220a-220r being used in each unit of the photonic integrated circuit, but other embodiments may use one or more optical detectors in any other suitable manner. For instance, while FIG. 4 shows unit "E" as including optical detectors 220c-220j to capture homodyne wavefront measurements associated with other units (B, D, F, and H), homodyne wavefront measurements from those units may be received from optical detectors in those units.

Figure 6:
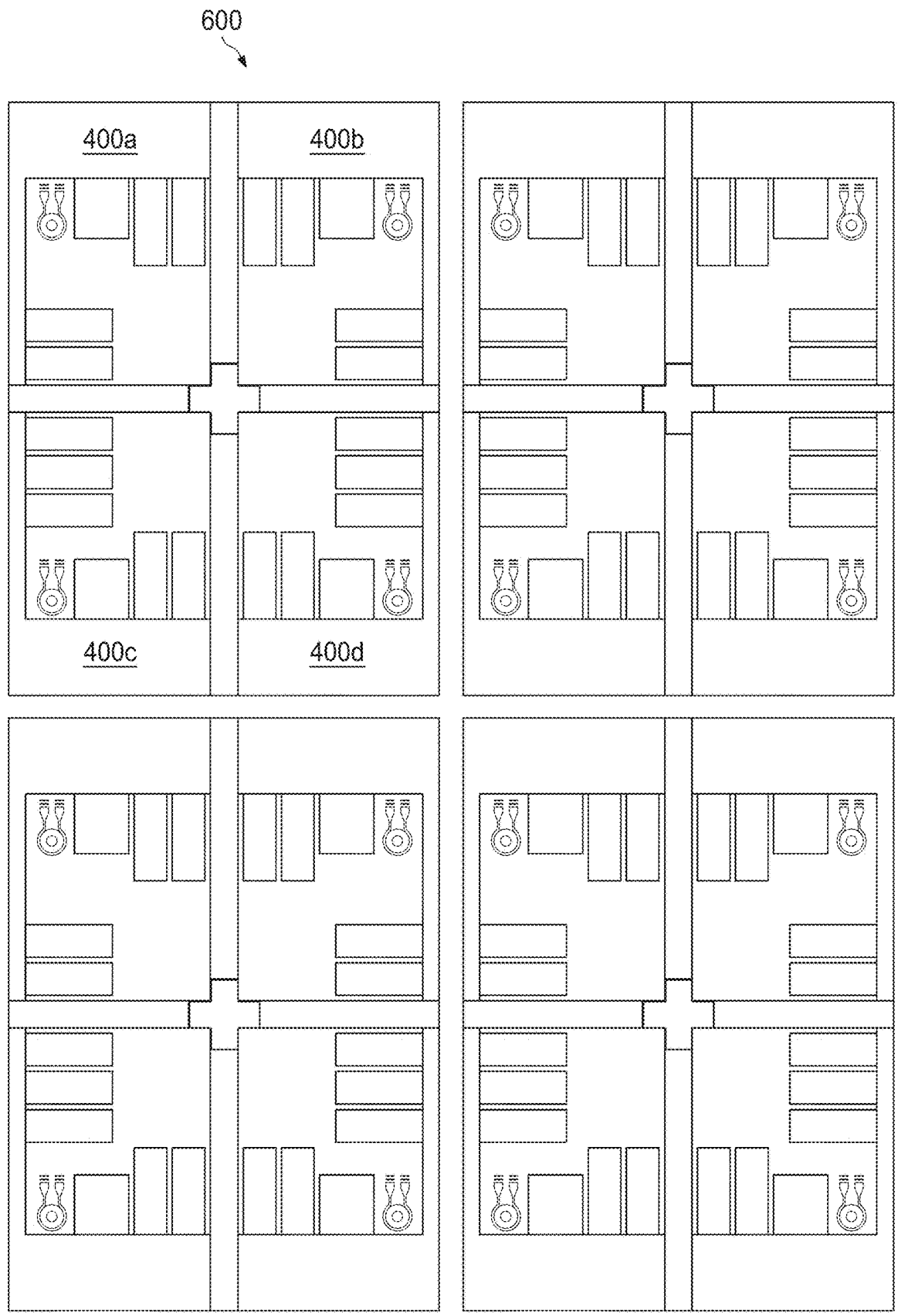
FIGS. 6 and 7 illustrate example layouts of a photonic integrated circuit supporting transmissive/reflective wavefront optical phase control according to this disclosure.
Figure 7:
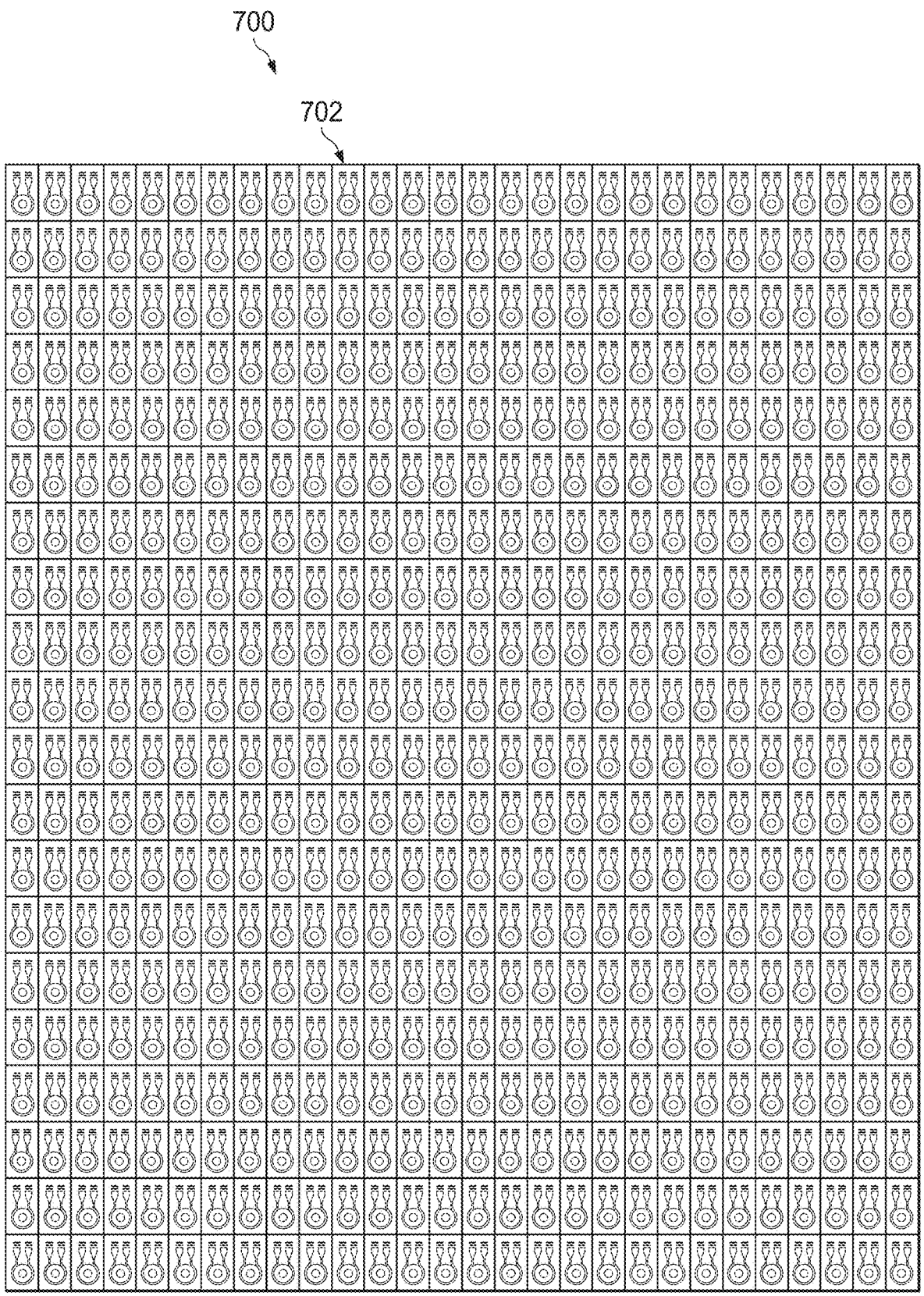

FIGS. 6 and 7 illustrate example layouts 600, 700 of a photonic integrated circuit supporting transmissive/reflective wavefront optical phase control according to this disclosure. As shown in FIG. 6, the layout 600 includes multiple instances of the four cells 400a-400d described above with respect to FIGS. 4 and 5. Here, any desired number of cells can be positioned horizontally and vertically to create a two-dimensional array of cells. Each cell can have any suitable size, shape, and dimensions. In some cases, each cell may be approximately 100 μm by approximately 100 μm, which provides a similar spatial resolution as many conventional wavefront sensors. However, it is possible to make the cells smaller and achieve higher cell densities as the sizes of the components in the cells decrease, which would provide improved spatial resolutions compared to conventional wavefront sensors. This type of approach may be used to provide a full on-PIC adaptive optic that supports both wavefront error measurement and wavefront error correction. Here, the on-PIC adaptive optic includes the various components shown in FIG. 6 integrated into a common photonic integrated circuit.

As shown in FIG. 7, the layout 700 includes a layer 702 containing the antenna elements 206-208, signal pathways 210, and phase modulators 212 for a large number of cells. The layer 702 can be physically coupled to, optically coupled to, or otherwise used in conjunction with a control device or system that can be used to modify the operations of the phase modulators 212 in the layer 702. For example, incoming optical energy captured using the layer 702 may be provided over a single mode optical fiber or other medium, and information about the optical energy can be processed using an orthonormal basis set of genetic optimization algorithms or other control algorithm(s) to identify how to adjust the phase modulators 212 in order to substantially reduce wavefront errors in the incoming optical energy. Here, the cells (antenna elements 206-208/signal pathways 210/phase modulators 212) can be packaged more tightly within the layout 700 compared to the layout 600 since control functions are implemented off the photonic integrated circuit.

Although FIGS. 6 and 7 illustrate examples of layouts 600, 700 of a photonic integrated circuit supporting transmissive/reflective wavefront optical phase control, various changes may be made to FIGS. 6 and 7. For example, other layouts of a photonic integrated circuit may be used to support transmissive/reflective wavefront optical phase control.

Figure 8:
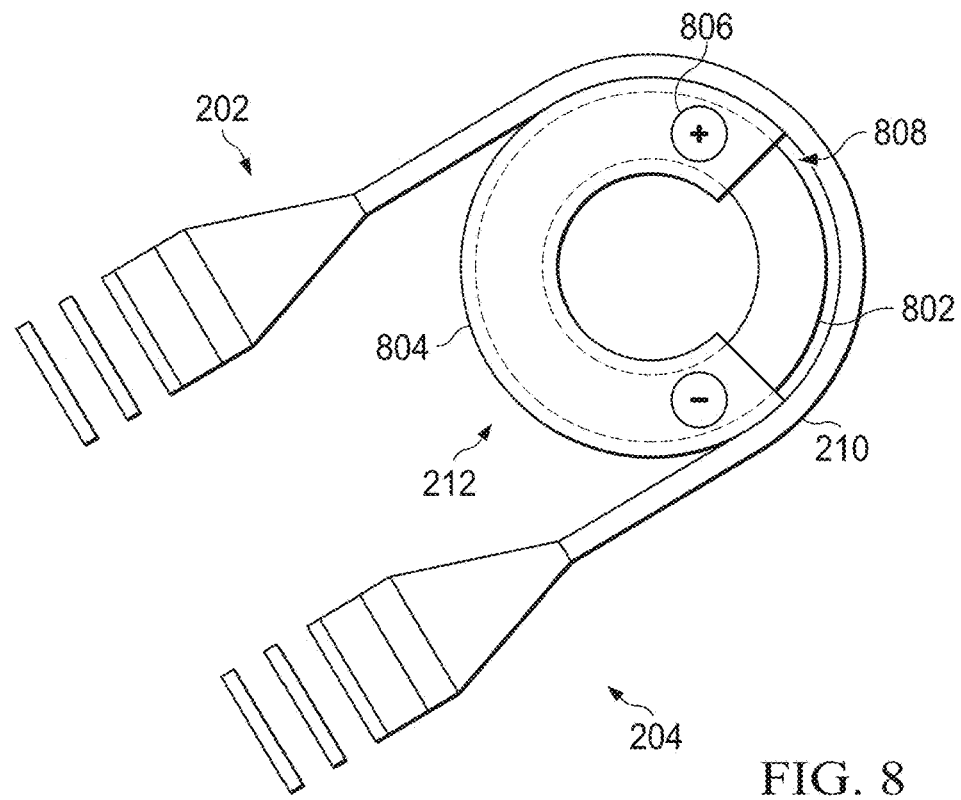
FIGS. 8 and 9 illustrate example phase modulators for use in a photonic integrated circuit according to this disclosure.
Figure 9:
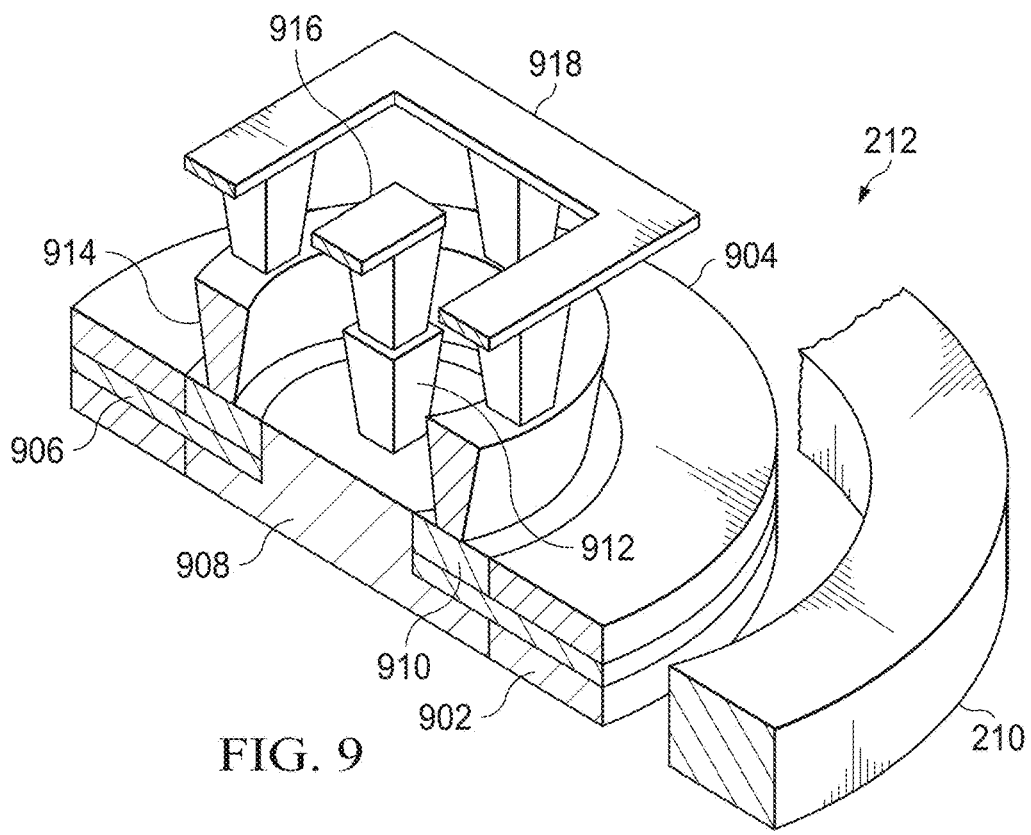

FIGS. 8 and 9 illustrate example phase modulators 212 for use in a photonic integrated circuit according to this disclosure. In particular, FIGS. 8 and 9 illustrate example embodiments of phase modulators 212 that may be used in the cells of the photonic integrated circuit in the optical device 200. As shown in FIG. 8, the phase modulator 212 here represents a thermal resonator that is implemented using a micro-ring resonator 802 and a heater 804 positioned above or otherwise near the micro-ring resonator 802. The micro-ring resonator 802 resonates based on an optical signal flowing through the associated signal pathway 210. Varying the temperature of the micro-ring resonator 802 alters the resonance wavelength of the micro-ring resonator 802, thereby changing the phase of the optical signal flowing through the signal pathway 210. Voltages can be applied to two electrical contacts 806 of the heater 804 in order to create the desired temperature change and therefore implement the desired phase shift of the optical signal flowing through the signal pathway 210. Different voltages applied to the heater 804 can cause different phase shifts to occur in the phase modulator 212. The voltages applied to the electrical contacts 806 may be provided by the associated phase controller 224.

The micro-ring resonator 802 may be formed from any suitable material(s), such as silicon, and in any suitable manner. The heater 804 may be formed from any suitable material(s), such as one or more metals, and in any suitable manner. The micro-ring resonator 802 may be separated from the heater 804 by any suitable material(s), such as silicon dioxide. The micro-ring resonator 802 and heater 804 may each have any suitable size, shape, and dimensions. In some embodiments, the micro-ring resonator 802 is annular and has a diameter of about 6 μm, and the heater 804 is crescent-shaped and has a diameter of about 6 μm. However, other shapes and sizes may be used here. A gap 808 between the micro-ring resonator 802 and the signal pathway 210 may have any suitable value, such as about 150 nm to about 210 nm (±10 nm). In some cases, design parameters like the thickness of the micro-ring resonator 802 or the size of the gap 808 can be altered in order to provide desired functionality for the phase modulator 212.

As shown in FIG. 9, the phase modulator 212 here represents a PN junction micro-ring modulator that is implemented using various regions of semiconductor material, such as doped and undoped silicon. In this example, the phase modulator 212 is shown in cross-section for explanation. Here, the phase modulator 212 includes a first annular semiconductor region 902 separated from a second annular semiconductor region 904. The annular semiconductor regions 902 and 904 can represent different types of semiconductor material, such as when the annular semiconductor region 902 represents an N-type semiconductor material and the annular semiconductor region 904 represents a P-type semiconductor material. A semiconductor region 906 (such as undoped silicon) can separate the regions 902-904. A doped semiconductor region 908 is positioned within the annular regions 902-904, and a doped semiconductor region 910 is positioned around an upper portion of the doped semiconductor region 908. The doped semiconductor regions 908 and 910 can represent different regions of semiconductor material with different dopants, such as when the doped semiconductor region 908 is doped with an N+ dopant and the doped semiconductor region 910 is doped with a P+ dopant. An electrical contact 912 can be used to form an electrical connection with the doped semiconductor region 908, and an electrical contact 914 can be used to form an electrical connection with the doped semiconductor region 910. An electrical connection 916 can be used to provide a voltage to the electrical contact 912, and an electrical connection 918 can be used to provide a voltage to the electrical contact 914.

Here, the various semiconductor regions 902-910 form a PN junction micro-ring modulator, and the electrical contacts 912, 914 and electrical connections 916, 918 allow voltages to be applied that alter the charge carrier density of the PN junction micro-ring modulator. This alters the phase of an optical signal flowing through the associated signal pathway 210. Voltages applied to the electrical connections 916, 918 can provide the desired voltage difference and therefore implement the desired phase shift of the optical signal flowing through the signal pathway 210. Different voltages applied to the electrical connections 916, 918 can cause different phase shifts to occur in the phase modulator 212. The voltages applied to the electrical connections 916, 918 may be provided by the associated phase controller 224.

Although FIGS. 8 and 9 illustrate examples of phase modulators for use in a photonic integrated circuit, various changes may be made to FIGS. 8 and 9. For example, the actual structure of a thermal resonator or PN junction micro-ring modulator can vary as needed or desired. Also, any other suitable structure may be used to phase-modulate optical signals in the photonic integrated circuits and optical devices described above.

The following describes example embodiments of this disclosure that implement or relate to photonic integrated circuit-based transmissive/reflective wavefront optical phase control. However, other embodiments may be used in accordance with the teachings of this disclosure.

In a first embodiment, an apparatus includes a photonic integrated circuit having multiple cells. Each cell includes first and second antenna elements, where the first antenna element is configured to receive a portion of optical energy and the second antenna element is configured to transmit the portion of the optical energy. Each cell also includes a signal pathway configured to transport the portion of the optical energy between the first and second antenna elements. Each cell further includes a phase modulator configured to adjust a phase of the portion of the optical energy transported over the signal pathway. The apparatus also includes multiple wavefront sensors configured to measure wavefront errors in the portions of the optical energy. The apparatus further includes multiple phase controllers configured to adjust operation of the phase modulators in order to at least partially reduce the wavefront errors.

In a second embodiment, a method includes receiving optical energy at a photonic integrated circuit and transmitting the optical energy from the photonic integrated circuit. The photonic integrated circuit includes multiple cells. Each cell includes first and second antenna elements, where the first antenna element receives a portion of the optical energy and the second antenna element transmits the portion of the optical energy. Each cell also includes a signal pathway that transports the portion of the optical energy between the first and second antenna elements. Each cell further includes a phase modulator that adjusts a phase of the portion of the optical energy transported over the signal pathway. The method also includes measuring wavefront errors in the portions of the optical energy using multiple wavefront sensors. The method further includes adjusting operation of the phase modulators using multiple phase controllers in order to at least partially reduce the wavefront errors.

Any single one or any suitable combination of the following features may be used with the first or second embodiment. The wavefront sensors and the phase controllers may be integrated into the photonic integrated circuit. Each of the wavefront sensors may include (i) multiple antennas each configured to capture additional portions of the optical energy and (ii) multiple optical detectors configured to generate wavefront measurements based on the additional portions of the optical energy captured by the multiple antennas. The multiple antennas in each wavefront sensor may include elongated antennas that are arranged orthogonally with respect to one another. The photonic integrated circuit may be divided into multiple units, and each unit may include multiple ones of the cells and be associated with one of the wavefront sensors. The multiple optical detectors in each wavefront sensor may include first optical detectors configured to generate wavefront measurements based on the additional portions of the optical energy captured by the multiple antennas of that wavefront sensor. The multiple optical detectors in each wavefront sensor may also include second optical detectors configured to generate wavefront measurements based on (i) the additional portions of the optical energy captured by the multiple antennas of that wavefront sensor and (ii) the additional portions of the optical energy captured by the multiple antennas of one or more wavefront sensors associated with one or more adjacent units of the photonic integrated circuit. The multiple optical detectors in each wavefront sensor may further include third optical detectors configured to generate wavefront measurements based on the additional portions of the optical energy captured by the multiple antennas of the one or more wavefront sensors associated with the one or more adjacent units of the photonic integrated circuit. The wavefront sensors may be configured to generate (i) homodyne wavefront measurements each associated with one of the units of the photonic integrated circuit and (ii) heterodyne wavefront measurements each associated with multiple ones of the units of the photonic integrated circuit. In each cell of the photonic integrated circuit, the first and second antenna elements may be arranged such that the portion of the optical energy transmitted by the second antenna element has a common polarization as the portion of the optical energy received by the first antenna element or such that the portion of the optical energy transmitted by the second antenna element has an opposite polarization as the portion of the optical energy received by the first antenna element. The photonic integrated circuit may be configured to function as an adaptive optic to reduce the wavefront errors in the optical energy.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. An apparatus comprising:
a photonic integrated circuit comprising multiple cells, each cell comprising:
first and second antenna elements, wherein the first antenna element is configured to receive a portion of optical energy and the second antenna element is configured to transmit the portion of the optical energy;
a signal pathway configured to transport the portion of the optical energy between the first and second antenna elements; and
a phase modulator configured to adjust a phase of the portion of the optical energy transported over the signal pathway;
multiple wavefront sensors configured to measure wavefront errors in the portions of the optical energy; and multiple phase controllers configured to adjust operation of the phase modulators in order to at least partially reduce the wavefront errors;

wherein each of the wavefront sensors comprises:
multiple antennas each configured to capture additional portions of the optical energy; and
multiple optical detectors configured to generate wavefront measurements based on the additional portions of the optical energy captured by the multiple antennas.

2. The apparatus of claim 1, wherein the wavefront sensors and the phase controllers are integrated into the photonic integrated circuit.

3. The apparatus of claim 1, wherein the multiple antennas in each wavefront sensor comprise elongated antennas that are arranged orthogonally with respect to one another.

4. The apparatus of claim 1, wherein:
the photonic integrated circuit is divided into multiple units, each unit including multiple ones of the cells and associated with one of the wavefront sensors; and
the multiple optical detectors in each wavefront sensor comprise:
first optical detectors configured to generate wavefront measurements based on the additional portions of the optical energy captured by the multiple antennas of that wavefront sensor; and
second optical detectors configured to generate wavefront measurements based on (i) the additional portions of the optical energy captured by the multiple antennas of that wavefront sensor and (ii) the additional portions of the optical energy captured by the multiple antennas of one or more wavefront sensors associated with one or more adjacent units of the photonic integrated circuit.

5. The apparatus of claim 4, wherein the multiple optical detectors in each of the wavefront sensors further comprise:
third optical detectors configured to generate wavefront measurements based on the additional portions of the optical energy captured by the multiple antennas of the one or more wavefront sensors associated with the one or more adjacent units of the photonic integrated circuit.

6. The apparatus of claim 1, wherein, in each cell of the photonic integrated circuit, the first and second antenna elements are arranged such that the portion of the optical energy transmitted by the second antenna element has a common polarization as the portion of the optical energy received by the first antenna element.

7. The apparatus of claim 1, wherein, in each cell of the photonic integrated circuit, the first and second antenna elements are arranged such that the portion of the optical energy transmitted by the second antenna element has an opposite polarization as the portion of the optical energy received by the first antenna element.

8. The apparatus of claim 1, wherein the photonic integrated circuit is configured to function as an adaptive optic to reduce the wavefront errors in the optical energy.

9. An apparatus comprising:
a photonic integrated circuit comprising multiple cells, each cell comprising:
first and second antenna elements, wherein the first antenna element is configured to receive a portion of optical energy and the second antenna element is configured to transmit the portion of the optical energy;
a signal pathway configured to transport the portion of the optical energy between the first and second antenna elements; and
a phase modulator configured to adjust a phase of the portion of the optical energy transported over the signal pathway;
multiple wavefront sensors configured to measure wavefront errors in the portions of the optical energy; and
multiple phase controllers configured to adjust operation of the phase modulators in order to at least partially reduce the wavefront errors;
wherein the photonic integrated circuit is divided into multiple units, each unit including multiple ones of the cells and associated with one of the wavefront sensors; and
wherein the wavefront sensors are configured to generate (i) homodyne wavefront measurements each associated with one of the units of the photonic integrated circuit and (ii) heterodyne wavefront measurements each associated with multiple ones of the units of the photonic integrated circuit.

10. The apparatus of claim 9, wherein each of the wavefront sensors comprises:
multiple antennas each configured to capture additional portions of the optical energy; and
multiple optical detectors configured to generate wavefront measurements based on the additional portions of the optical energy captured by the multiple antennas.

11. A method comprising:
receiving optical energy at a photonic integrated circuit and transmitting the optical energy from the photonic integrated circuit, the photonic integrated circuit comprising multiple cells, each cell comprising:
first and second antenna elements, wherein the first antenna element receives a portion of the optical energy and the second antenna element transmits the portion of the optical energy;
a signal pathway that transports the portion of the optical energy between the first and second antenna elements; and
a phase modulator that adjusts a phase of the portion of the optical energy transported over the signal pathway;
measuring wavefront errors in the portions of the optical energy using multiple wavefront sensors; and
adjusting operation of the phase modulators using multiple phase controllers in order to at least partially reduce the wavefront errors;
wherein the photonic integrated circuit is divided into multiple units, each unit including multiple ones of the cells and associated with one of the wavefront sensors; and
wherein the wavefront sensors generate (i) homodyne wavefront measurements each associated with one of the units of the photonic integrated circuit and (ii) heterodyne wavefront measurements each associated with multiple ones of the units of the photonic integrated circuit.

12. The method of claim 11, wherein the wavefront sensors and the phase controllers are integrated into the photonic integrated circuit.

13. The method of claim 11, wherein each of the wavefront sensors comprises:
multiple antennas each configured to capture additional portions of the optical energy; and multiple optical detectors configured to generate wavefront measurements based on the additional portions of the optical energy captured by the multiple antennas.

14. The method of claim 13, wherein the multiple antennas in each wavefront sensor comprise elongated antennas that are arranged orthogonally with respect to one another.

15. The method of claim 13, wherein the multiple optical detectors in each wavefront sensor comprise:
   first optical detectors that generate wavefront measurements based on the additional portions of the optical energy captured by the multiple antennas of that wavefront sensor; and
   second optical detectors that generate wavefront measurements based on (i) the additional portions of the optical energy captured by the multiple antennas of that wavefront sensor and (ii) the additional portions of the optical energy captured by the multiple antennas of one or more wavefront sensors associated with one or more adjacent units of the photonic integrated circuit.

16. The method of claim 15, wherein the multiple optical detectors in each of the wavefront sensors further comprise:
   third optical detectors that generate wavefront measurements based on the additional portions of the optical energy captured by the multiple antennas of the one or more wavefront sensors associated with the one or more adjacent units of the photonic integrated circuit.

17. The method of claim 11, wherein, in each cell of the photonic integrated circuit, the first and second antenna elements are arranged such that the portion of the optical energy transmitted by the second antenna element has a common polarization as the portion of the optical energy received by the first antenna element.

18. The method of claim 11, wherein, in each cell of the photonic integrated circuit, the first and second antenna elements are arranged such that the portion of the optical energy transmitted by the second antenna element has an opposite polarization as the portion of the optical energy received by the first antenna element.

19. The method of claim 11, further comprising:
   using the photonic integrated circuit as an adaptive optic to reduce the wavefront errors in the optical energy.

20. A method comprising:
   receiving optical energy at a photonic integrated circuit and transmitting the optical energy from the photonic integrated circuit, the photonic integrated circuit comprising multiple cells, each cell comprising:
      first and second antenna elements, wherein the first antenna element receives a portion of the optical energy and the second antenna element transmits the portion of the optical energy;
      a signal pathway that transports the portion of the optical energy between the first and second antenna elements; and
      a phase modulator that adjusts a phase of the portion of the optical energy transported over the signal pathway;
   measuring wavefront errors in the portions of the optical energy using multiple wavefront sensors; and
   adjusting operation of the phase modulators using multiple phase controllers in order to at least partially reduce the wavefront errors;
   wherein the optical energy is received along a first surface of the photonic integrated circuit; and
   wherein the optical energy is transmitted along both the first surface of the photonic integrated circuit and a second surface of the photonic integrated circuit opposite the first surface.

21. The method of claim 20, wherein:
   the photonic integrated circuit is divided into multiple units, each unit including multiple ones of the cells and associated with one of the wavefront sensors;
   the wavefront sensors generate (i) homodyne wavefront measurements each associated with one of the units of the photonic integrated circuit and (ii) heterodyne wavefront measurements each associated with multiple ones of the units of the photonic integrated circuit; and
   each of the wavefront sensors comprises:
      multiple antennas each configured to capture additional portions of the optical energy; and
      multiple optical detectors configured to generate wavefront measurements based on the additional portions of the optical energy captured by the multiple antennas.

* * * * *